United States Patent [19]

Komatsu

[11] Patent Number: 5,646,616
[45] Date of Patent: Jul. 8, 1997

[54] PICKING SYSTEM

[75] Inventor: Yukio Komatsu, Kani, Japan

[73] Assignee: Murata Kikai Kabushiki Kaisha, Kyoto, Japan

[21] Appl. No.: 494,983

[22] Filed: Jun. 26, 1995

[30] Foreign Application Priority Data

Jul. 1, 1994 [JP] Japan .................................. 6-171618

[51] Int. Cl.⁶ .................................................. G08G 1/123
[52] U.S. Cl. .......................... 340/988; 340/674; 340/572; 340/825.35; 340/825.49; 364/450; 364/478.14; 395/222
[58] Field of Search ..................................... 340/988, 674, 340/572, 825.35, 825.49; 364/401, 403, 450, 478

[56] References Cited

U.S. PATENT DOCUMENTS

| | | | |
|---|---|---|---|
| 3,340,509 | 9/1967 | Krause | 340/825.35 |
| 4,027,840 | 6/1977 | Blair | 340/988 |
| 4,388,608 | 6/1983 | Bernard | 340/990 |
| 4,973,952 | 11/1990 | Malec et al. | 340/825.35 |
| 4,988,025 | 1/1991 | Lipton et al. | 340/825.35 |
| 5,111,196 | 5/1992 | Hunt | 340/825.35 |
| 5,158,310 | 10/1992 | Tannehill et al. | 280/33.992 |
| 5,194,856 | 3/1993 | Zijlstra | 340/825.35 |
| 5,260,694 | 11/1993 | Remahl | 340/988 |
| 5,264,822 | 11/1993 | Vogelman et al. | 340/692 |
| 5,287,266 | 2/1994 | Malec et al. | 364/401 |
| 5,406,271 | 4/1995 | Sonnendorfer et al. | 340/825.35 |

*Primary Examiner*—Jeffery Hofsass
*Assistant Examiner*—Benjamin C. Lee
*Attorney, Agent, or Firm*—Armstrong, Westerman, Hattori, McLeland & Naughton

[57] ABSTRACT

To display picking information on a liquid crystal display unit, ID tags are disposed at the entrance and the exits of paths between racks, and the current position of a picking cart is recognized by way of communication with an antenna. Between an entrance and an exit, the distance over which the picking cart has traveled from the communication position with an ID tag is detected by way of an encoder which detects rotation of a wheel of the picking cart to recognize the current position.

3 Claims, 3 Drawing Sheets

PICKING SYSTEM

BACKGROUND OF THE INVENTION

1. Field of the Invention

This invention relates to a picking system wherein, in order to pick up a predetermined number of predetermined articles from a rack, picking information is displayed on a display apparatus in accordance with the current position of a cart and an operator performs a picking up operation in accordance with the thus displayed picking information.

2. Prior Art

A picking system which makes use of a cart is employed practically in a distribution center or the like. The picking system includes a cart manually pushed by an operator, and racks on which various kinds of articles are accommodated. The cart includes a display unit for displaying picking information such as the position of an object shelf or the type or the amount of articles when the operator arrives at the front of the object shelf so that the operator may pick up a predetermined number of articles of a predetermined type readily and accurately.

In order to display picking information on the display unit, the current position of the cart must be recognized. For recognition of the current position, index means for indexing predetermined positions are disposed along a travel path of the cart, and an index detection means for detecting the index means is provided on the cart. The index means and the index detection means are, for example, in the form of an optical communication apparatus or an ID tag and an antenna, and a large number of such index means are provided so as to cover the entire travel path of the cart and individually index different predetermined positions.

For example, an ID tag must be provided for each of frontages of shelves forming racks, and where the system is great, a very large number of ID tags are required. As the number of ID tags to be installed increases, the cost increases and the labor and the time required increase, and besides, also the burden of maintenance operations such as exchange of a battery increases.

SUMMARY OF THE INVENTION

It is an object of the present invention to provide a picking system which can decrease a required number of index means for indexing predetermined positions.

In order to attain the object described above, according to the present invention, a picking system wherein picking information is displayed on a display apparatus in accordance with a current position of a cart is constructed such that it comprises an index detection means for detecting an index means disposed at predetermined positions, travel distance detection means for detecting a travel distance of the cart, and position recognition means for recognizing the current position in accordance with position information obtained from the index detection means and travel distance information obtained from the travel distance detection means, all carried on the cart.

Further, according to the present invention, the picking system is constructed such that the index means are provided only at an entrance and an exit of each of paths between racks.

Furthermore, according to the present invention, the picking system is constructed such that the index detection means is an antenna for detecting ID tags disposed only at the entrance and the exit of each of the paths between the racks, and the travel distance detection means is an encoder for detecting rotation of a wheel of the cart.

Since the present invention is constructed in such a manner as described above, the following operation is performed.

In the picking system according to the present invention, the index detection means detects any of the index means While the travel distance detection means detects the travel distance of the cart, and they send position information and travel distance information to the position recognition means, respectively. The position recognition means recognizes the current position in accordance with the position information and the travel distance information and controls the display means to display picking information in accordance with the current position.

In the picking system according to the present invention, the index detection means detects any of the index means provided only at the entrance and the exit of each of the paths between the racks.

In the picking system according to the present invention, the antenna carried on the cart detects any of the ID tags disposed only at the entrance and the exit of each of the paths between the racks, and the encoder detects rotation of the wheel of the cart to detect the travel distance of the cart.

DETAILED DESCRIPTION OF PREFERRED EMBODIMENT

Figure 1:
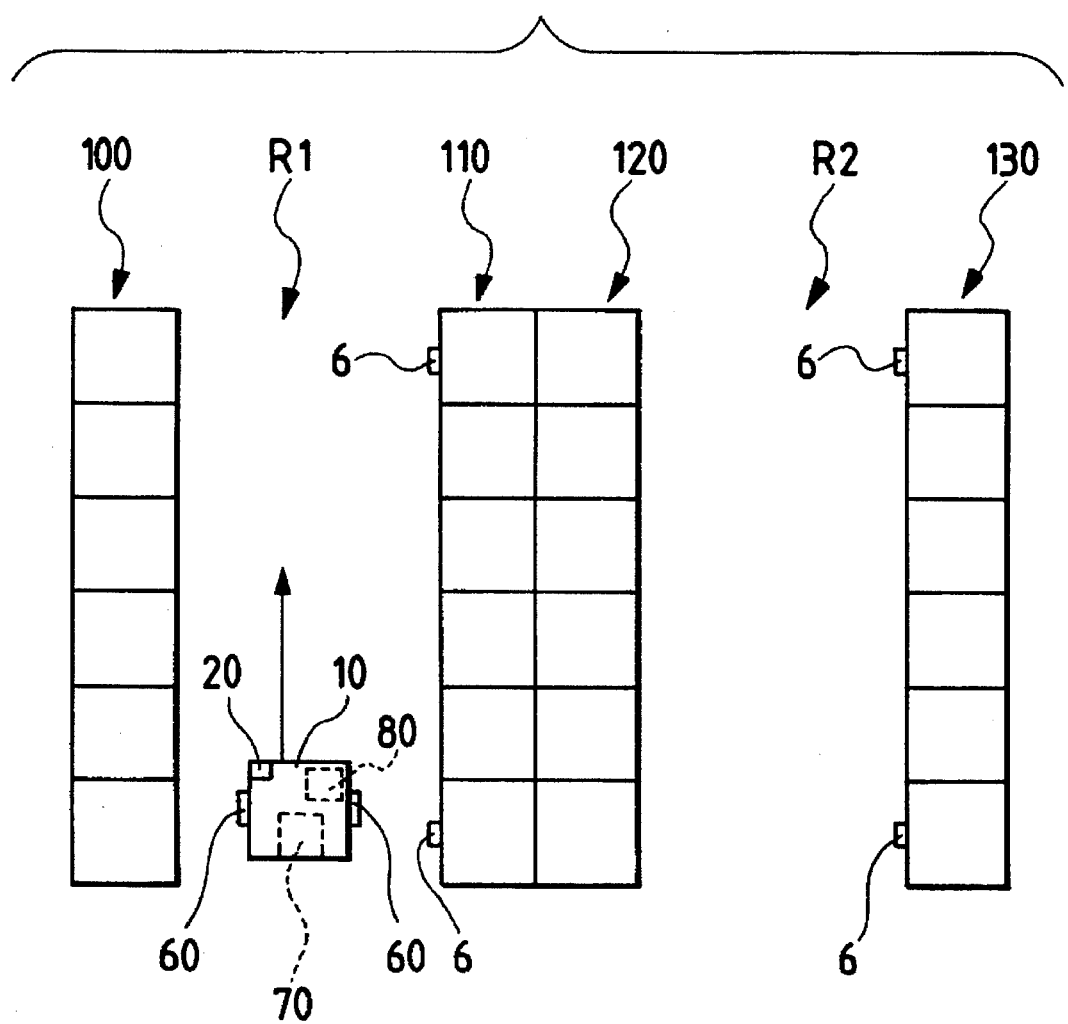
FIG. 1 is a schematic plan view showing an embodiment of a picking system according to the present invention.

An embodiment shown in the drawings will be described below.

Figure 2:
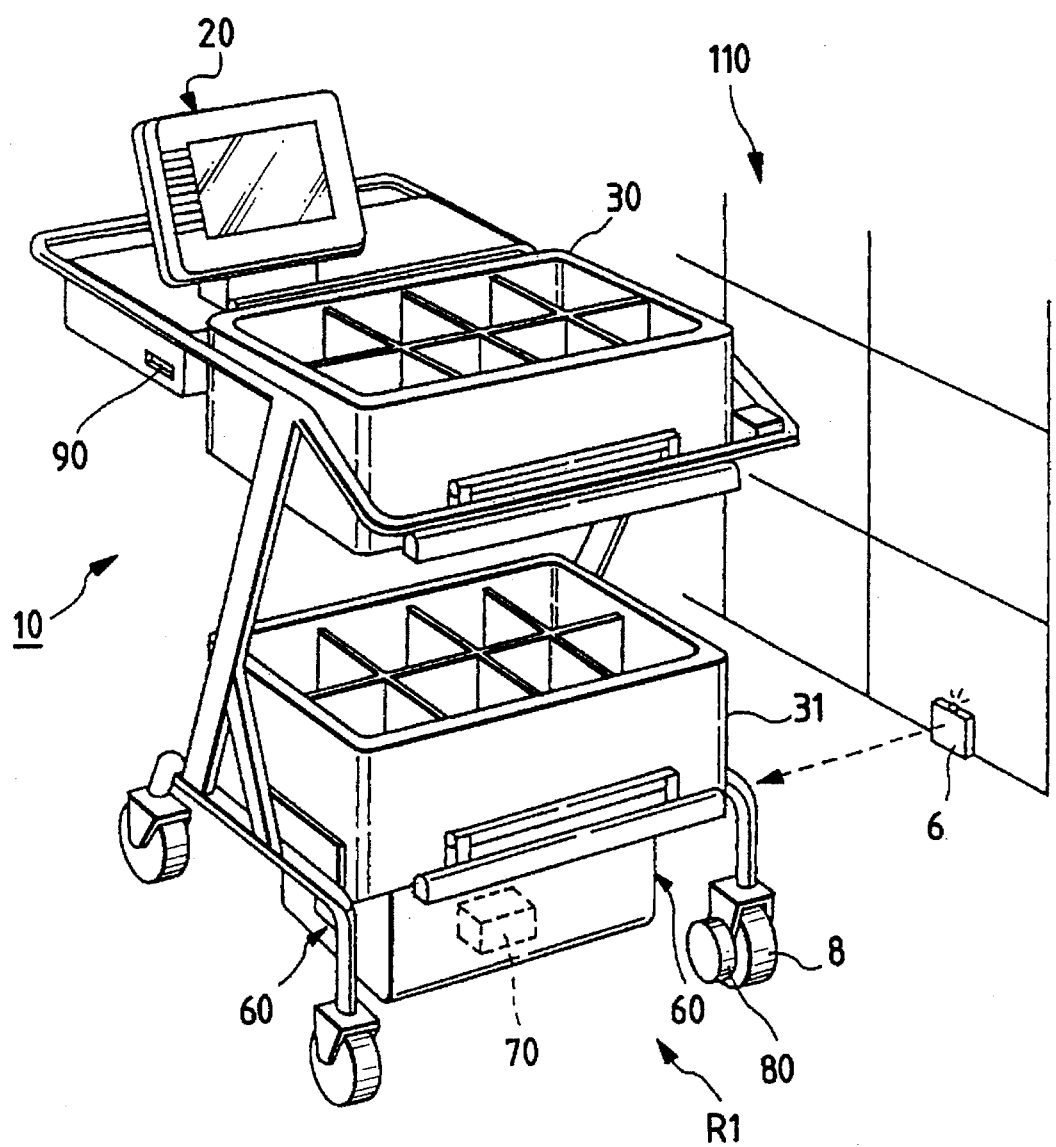
FIG. 2 is a perspective view showing a picking cart of the embodiment of FIG. 1.

FIG. 1 is a schematic plan view showing the construction of an embodiment of a picking system according to the present invention; FIG. 2 is a perspective view showing a cart of the same embodiment; and FIG. 3 is a block diagram showing a principal construction of a control apparatus of the same embodiment.

Figure 3:
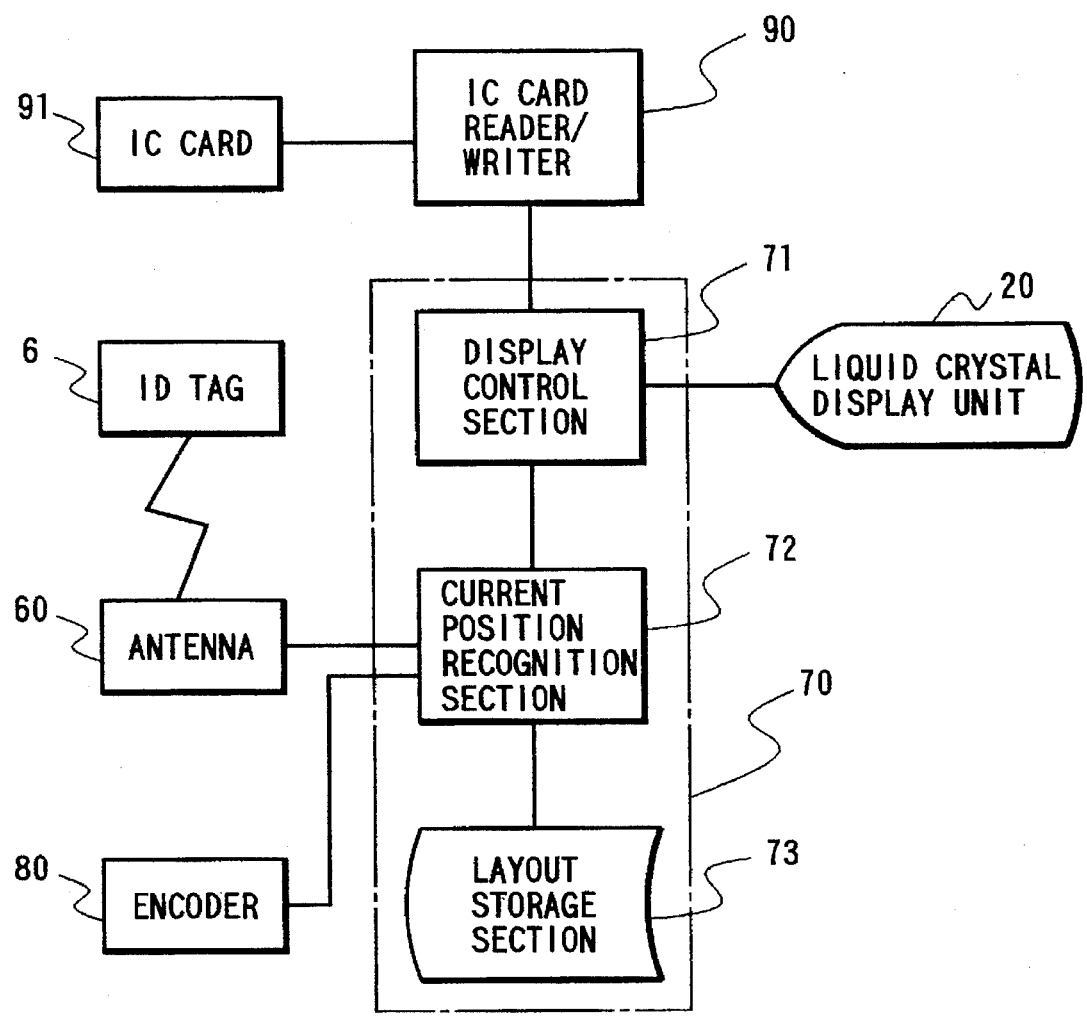
FIG. 3 is a block diagram showing a principal portion of a control structure of the picking cart of the embodiment of FIG. 1.

Referring to FIGS. 1 to 3, a picking cart 10 travels along paths R1 and R2 between racks 100 to 130 when it is pushed by an operator. A picking operation is performed such that the operator picks up articles accommodated on shelves of the racks 100 to 130 and transfers them into buckets 30 and 31.

The picking up operation is performed referring to picking information displayed on a liquid crystal display unit 20. A host computer (not shown) for controlling the picking system produces a picking request including a type and an amount of articles to be picked up in accordance with an order from a customer and writes the picking request into an IC card 91.

The IC card 91 into which the picking request has been written is inserted into an IC card reader/writer 90, by which data thereof are read. A display control section 71 of a control section 70 for controlling the picking cart 10 controls, in accordance with the picking request thus read, the liquid crystal display unit 20 to display the picking information in response to the current position of the picking cart 10.

The picking information includes the article number, the quantity and the units of articles to be picked up, the position of a shelf on which the articles are accommodated, a cart advancement route which is determined for each operation in accordance with the type of the articles to be picked up, and so forth. Since the picking information must be displayed in response to the current position, the display control section 71 must grasp at which position the picking cart 10 is currently positioned on the rack layout.

In the picking system of the present embodiment, in order to recognize the current position of the picking cart 10, ID tags 6 disposed at the entrances and the exits of the paths R1 and R2 for indexing the positions, a pair of antennae 60 carried on the picking cart 10 for communicating with the ID tags 6, and an encoder 80 for detecting rotation of one of wheels 8 of the picking cart 10 are provided. The antennas 60 and the encoder 80 are connected to a current position recognition section 72 of the control section 70. Meanwhile, a layout storage section 73 for storing the rack layout and so forth is connected to the current position recognition section 72.

Each of the ID tags 6 and one of the antennae 60 can communicate with each other using microwaves when the picking cart 10 moves until the antenna 60 is positioned sidewardly of the ID tag 6. The individual ID tags 6 transmit different identification signals from one another so that the current position recognition section 72 can discriminate with which one of the ID tags 6 it is communicating.

The encoder 80 transmits the number and the direction of rotations of the wheel 8 to the current position recognition section 72, and the current position recognition section 72 can detect the travel distance of the picking cart 10 from the outer diameter of the wheel 8.

Operation of the present embodiment will be described below.

When an operator advances into the path R1 pushing the picking cart 10 as shown in FIG. 1, it becomes possible to perform communication between one of the antennas 60 and one of the ID tags 6 disposed at the entrance of the path R1. The current position recognition section 72 recognizes the current position by identifying the location where the ID tag 6 with which communication has been enabled is disposed from the picking layout stored in the layout storage section 73. Further, the current position recognition section 72 recognizes the direction of the picking cart 10 depending upon with which one of the left and right antennae 60 the communication is being performed.

As the picking cart 10 further travels, the communication between the ID tag 6 and the antenna 60 becomes impossible. In this instance, since the current position recognition section 72 can detect the travel distance by way of the encoder 80, it can recognize the position on the picking layout by detecting, based on the position recognized by the communication with the ID tag 6, by what distance the picking cart 10 has traveled from the position. The path R1 is linear, and unless the picking cart 10 is caused to make a U-turn, little error is produced in the position recognition.

As the picking cart 10 is further moved, it becomes possible to perform communication between one of the antennas 60 and one of the ID tags 6 disposed at the exit of the path R1, and consequently, the current position recognition section 72 performs automatic correction of the current position based on the location of the ID tag 6.

The current position discriminated in this manner is transmitted to the display control section 71, and the display control section 71 displays the picking information in response to the current position. Consequently, the operator can refer to the picking information to perform a picking operation.

As described above, in the picking system of the present embodiment, recognition of the current position in a section in which communication between any ID tag 6 and any antenna 60 is impossible is performed by detecting the travel distance of the picking cart 10 by way of the encoder 80.

Consequently, when compared with a conventional picking system wherein a large number of ID tags are disposed so as to enable communication at any position, the number of ID tags can be reduced, and consequently, the picking system can be constructed at a reduced cost and also maintenance thereof is facilitated.

Although the embodiment of the present invention is described above, the present invention is not limited to the embodiment described above, but can be put into practice in suitable modifications within the range of the scope of the present invention.

For example, while, in the embodiment shown, the ID tags 6 are disposed only at the entrances and the exits of the paths R1 and R2, where the paths are long, current position recognition of a high degree of accuracy can be achieved by performing correction of an error using ID tags 6 suitably disposed intermediately along the paths.

As described above, with the picking system according to the present invention, since the current position can be recognized by the index means and the travel distance detection means, it is possible to reduce the number of index means to be installed, and consequently, the system can be constructed at a reduced cost and also the maintenance of the index means can be minimized.

Further, in the picking system according to the present invention, since the index means are disposed only at the entrances and the exits of the individual paths between the racks and the current position is recognized between an entrance and an exit using the travel distance detection means, the number of index means can be minimized.

Furthermore, in the picking system according to the present invention, since the number of ID tags is reduced, the picking system can be constructed at a reduced cost and the labor for maintenance such as exchange of a battery can be reduced remarkably. Further, since rotation of the wheel of the cart is detected by means of the encoder to detect the travel distance, the travel distance can be detected with an inexpensive and simple construction.

What is claimed is:

1. An article pick-up system including a display device for displaying article pick-up information as to a current position of a cart having wheels, comprising:

a first means for indexing predetermined positions, said first means being disposed at a predetermined position;

a second means for detecting position information of said first means;

a third means for detecting a number and a direction of rotations of at least one of said wheels; and a fourth means for detecting a travel distance of said cart based on said number and said direction of rotation of said at least one of said wheels received from said third means and based on an outer diameter of said wheel, and for recognizing said current position of said cart in accordance with said position information resulting from said second means and said travel distance, wherein said second, third and fourth means are provided on said cart.

2. The article pick-up system as recited in claim 1, wherein said first means is provided only at an entrance and an exit of each path between racks.

3. The article pick-up system as recited in claim 1, wherein said second means includes an antenna for detecting ID tags disposed only at said entrance and said exit of each path between said racks, and said third means includes an encoder for detecting rotation of a wheel of said cart.

* * * * *